Jan. 9, 1923.
B. CURRIER ET AL.
PROTECTING DEVICE FOR POLYPHASE CIRCUITS.
FILED AUG. 20, 1917.
1,441,267.
2 SHEETS—SHEET 2.
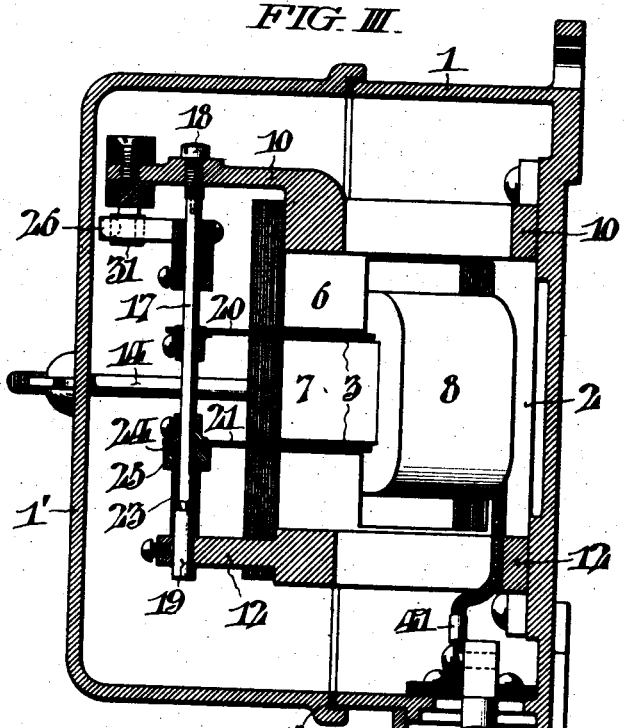
FIG. III.
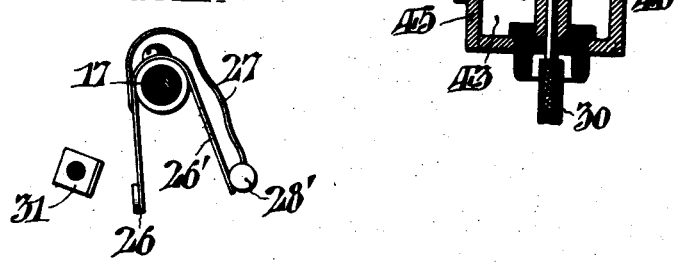
FIG. IV.
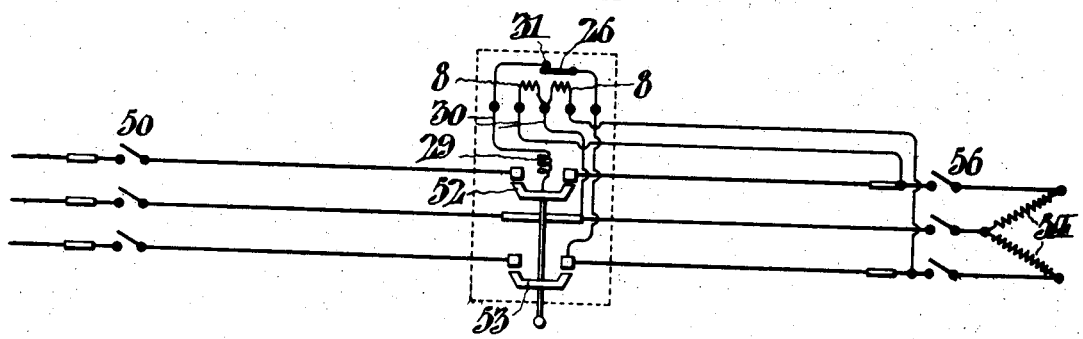
FIG. V.
Inventors:
Burleigh Currier &
Joseph B. Seaman.
By Macy & Paul,
Attorneys
Witnesses:
John C. Bergner
James H. Bell Patented Jan. 9, 1923.

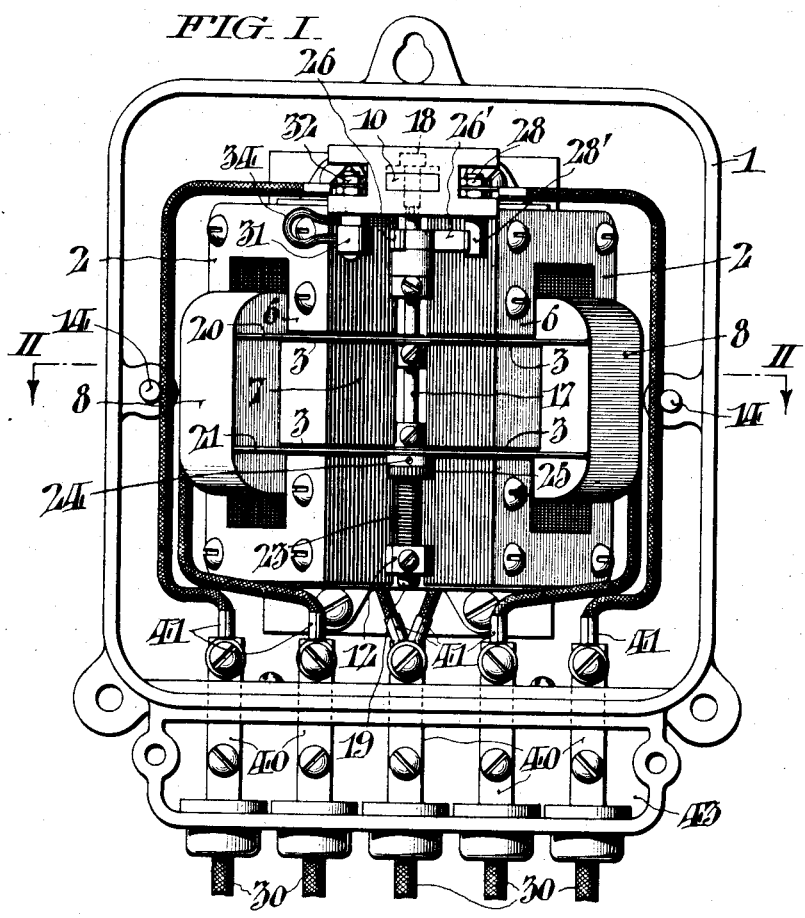
FIG. I.
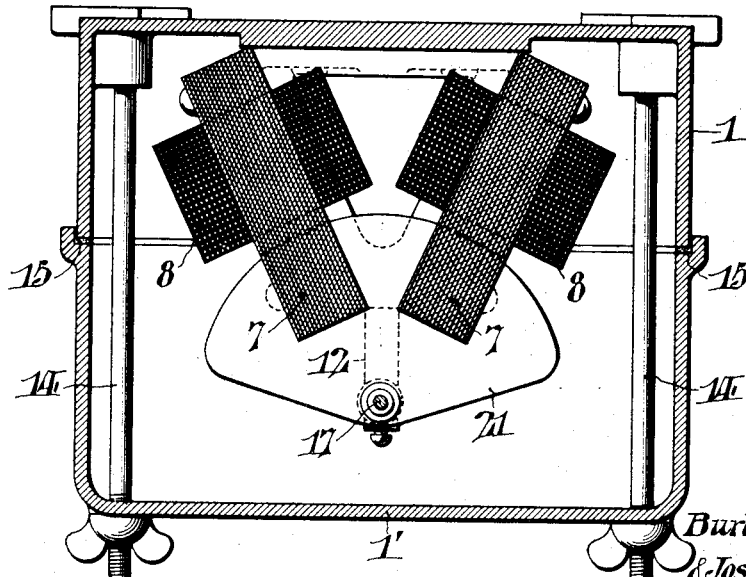
FIG. II.

1,441,267

UNITED STATES PATENT OFFICE.

BURLEIGH CURRIER AND JOSEPH B. SEAMAN, OF PHILADELPHIA, PENNSYLVANIA, ASSIGNORS TO PENNSYLVANIA APPLIANCE COMPANY, OF PHILADELPHIA, PENNSYLVANIA, A CORPORATION OF NEW JERSEY.

PROTECTING DEVICE FOR POLYPHASE CIRCUITS.

Application filed August 20, 1917. Serial No. 187,076.

*To all whom it may concern:*

Be it known that we, BURLEIGH CURRIER and JOSEPH B. SEAMAN, of Philadelphia, in the county of Philadelphia and State of Pennsylvania, have invented certain new and useful Improvements in Protecting Devices for Polyphase Circuits, whereof the following is a specification, reference being had to the accompanying drawings.

This invention relates to protecting devices for polyphase circuits and resides in apparatus which is responsive to a fall of potential below some predetermined value, to a failure of one or all of the phases or to a reversal of a phase or phases of the polyphase circuit.

One of the main objects of our invention is to provide a relay that shall respond instantly to any reversal of phase or predetermined fall of potential or to any defect in the relay coils and which requires a minimum of power for its operation, thus insuring a continuity of protection. The importance of this is apparent in the operation of certain classes of alternating current machinery. Thus, for instance, in the case of electric motors driving cranes, hoisting conveyers and elevators, if the phases should become relatively reversed by accident, the direction of rotation of the motor would be reversed and serious consequences might ensue if the motor circuit were not immediately broken. One of the purposes of our invention is to produce a relay with few moving parts and requiring no delicate adjustments, so that it will require practically no attention and will be reliable under all circumstances.

Our invention will be clearly understood from the following description in connection with the accompanying drawings, in which—

Fig. I. is a front elevation of a relay embodying our invention, the cover of the casing being removed.

Fig. II. is a cross section on the line II—II of Fig. I.

Fig. III. is a central vertical section perpendicular to the plane of Fig. I.

Fig. IV. is a detail view of the relay contacts; and

Fig. V. is a diagram of a polyphase circuit showing the manner of connecting the relay.

The magnetic system of the relay comprises two laminated cores 2, of the E type, each having the magnetic circuit entirely closed except for two narrow slots or air gaps 3, in the front vertical member 6, upon either side of the central horizontal leg 7, which carries the energizing coil 8. The magnet cores 2, are bolted to brass or other non-magnetic brackets or webbing members 10, 12, secured to the inner rear wall of the box or case 1. The front or cover 1' is secured by the bolts 14, the joint between the front and rear portions of the case being made moisture and dust proof by a packing 15.

The movable parts of the relay are carried by a spindle or shaft 17, mounted between bearings 18, and 19, which are adjustably supported in the forward ends of the brackets 10, and 12. The aluminum or other non-magnetic metal sectors 20, and 21, which co-operate with the magnets, are carried by hubs or sleeves secured to the shaft 17, in position to oscillate in the air gaps 3. The coils 8, are connected across the conductors of the polyphase system in the manner indicated in Fig. V, producing in the cores 2, magnetic fields which induce eddy currents in the sectors or disks 20, 21, the reaction between the induced currents and the magnetic fields causing the disks to swing in a direction depending upon the sequence of phases in the coils. The torque or turning moment exerted upon the sectors or disks by the reaction of the shifting magnetic field resulting from the polyphase currents flowing in the coils and the induced eddy currents, is opposed or assisted by the torque of a spiral spring 23, which is secured in any suitable manner at its lower end to the bracket 12, and at its upper end, is adjustably secured to the shaft by a set screw 24, after the desired tension has been placed thereon by turning the milled collar 25.

For the purpose of controlling the circuit of a switch tripping coil 29, a contact arm is secured to the shaft and a co-operating contact block is carried by the bracket 10. The movable contact may be in the form of a yoke having arms 26, 26' and be connected to one side of the tripping circuit 30, by means of a flexible conductor 27, secured to a binding post 28, which is provided with a depending part 28' forming a stop. The co-operating contact block 31, is swivelled upon the depending shank of a binding post 32, connected to the other side of the tripping circuit, the block and post being connected by a light pliant conductor 34. The post 28' and contact block 31, serve also as stops to limit the travel of the disks or sectors. In order to provide a rapid and positive interruption of the tripping circuit when the disks are actuated, the face of the contact on the arm 26, is made perpendicular to the direction of its motion and the contact face of the stationary block 31, is self-aligning therewith by reason of its swivelled mounting. This arrangement secures a positive connection between the contacts and prevents the opening of a connected circuit breaker before the relay has had time to operate when potential is thrown on the main circuit.

The brass terminals 40, to which are secured the terminal clips 41, attached to the leads from the relay windings and from the contact posts of the tripping circuit, project into the terminal chamber 43, which is provided with an independent cover plate 45. When the relay has been properly adjusted and calibrated it is unnecessary to again open the case 1, as the connections with the tripping circuit and the line conductors may be made in the terminal chamber.

The operation of the apparatus will be understood by those familiar with this art from the foregoing description of the structure. Assuming that the main line switch 50, is closed, and the circuit breaker has been closed so that the blades 52, and 53, bridge the contacts in the two phases of the local circuit, the motor 54, may be connected by closing its switch 56. If the relay is arranged as a normally closed type, the moving parts will be normally held by the turning moment of the sectors acting in opposition to the spring 23, to close the tripping circuit at the contacts 26, 31, so that the tripping magnet 29, will be energized as soon as the circuit breaker is closed. If the line conductors have been properly connected, the sequence of phases in the relay coils 8, produces a shifting field which cooperates with the induced eddy currents in the sectors 20, 21, to cause a turning moment tending to maintain the contacts of the tripping circuit closed. If the connections with the line conductors are incorrect, the sequence of phases in the relay circuit produces a shifting field which causes a torque in the sectors acting in the same direction as the spring, and the arm 26' will, therefore, remain against the back stop 28', and the motor circuits will remain open. Again, if during normal operation, the phases become accidentally reversed, thereby changing the direction of the shifting field in the relay, the torque of the sectors will instantly assist the spring to open the tripping circuit at the contacts 26, 31. The relay may be so calibrated that the torque necessary to hold the contacts of the tripping circuit closed will be insufficient when the current in the relay coils falls below a certain predetermined value. It is further evident that the tripping circuit contacts will not be maintained in closed position if either of the relay coils should become defective, since it requires the turning moment exerted upon the sectors by the shifting field due to the combined action of the currents of different phase in the two coils to prevent the opening of the tripping circuit.

The advantages to be derived from the use of this invention and its adaptability to widely different service conditions will be appreciated by engineers. Due to the extreme simplicity of construction, the ruggedness of its parts and the minimum of moving elements, the relay requires very little care and attention. The instantaneous action of this relay, in contrast with the sluggish action of instruments of the solenoid type or the usual magnetically actuated vibratory member, makes it most desirable for use in connection with elevator or crane motors in which it is highly essential that the service be interrupted in the minimum amount of time upon phase reversal. Protection is afforded at all times, not only against a failure of the current supply or abnormally low voltage conditions in one or all of the phases, or a reversal of one of the phases, but also in the event of a defect in the relay apparatus itself or in its connections.

We have described in detail the particular construction shown in the accompanying drawings for the purpose of disclosing an embodiment of our invention, but it is evident that various changes and modifications may be made within the scope of our claims and without in any manner departing from the invention. By means of the adjustable spiral spring connected with the moving element, the relay may be adjusted so that when disconnected from service, the contact arm will be urged toward either the front contact or toward the back stop. It is usual to adjust the spring to urge the contact arm against the back stop for the normally closed type of relay and against the front contact for the normally open type, whereby the relay may be said to be self-supervising under both conditions, that is, the relay action under normal conditions is opposed by the spring and upon any failure of the relay, the operation of the tripping devices or other auxiliaries becomes automatic. By proper adjustment of the spring tension, any desired condition of equilibrium between the torque of the spring and that exerted by the magnetic system through the sectors may be obtained. The relay can be so adjusted that when the supply voltage falls below any predetermined value, the tripping circuit will be operated, the relay thus acting as a no-voltage release.

Again the tension of the spring may be so adjusted that the contact arm will be held in mid-position between two stationary contacts connected to the tripping coils, when the current in the polyphase supply circuit is normal, whereby upon the occurrence of an abnormally high current the arm will be moved against one contact and upon failure of the current or upon a reversal of phase, the arm will be carried against the other contact, the relay thus serving as an overload, reverse phase and underload relay.

It frequently happens that the fuse in one leg of a polyphase supply circuit is blown and should any polyphase apparatus, such as motors, be connected in the circuit at this time, only one phase will be operative. In such instances, serious damage to the motor will frequently result if the condition is not quickly discovered. Our relay can be so adjusted that, under such conditions, the tripping circuit will be operated to disconnect the supply circuit before the motor becomes seriously overloaded.

Having thus described our invention, we claim:

1. A polyphase relay, comprising a pair of superposed frame members, a pair of E cores connecting said frame members, one core secured to each side of the latter, a shaft pivotally supported upon and between said frame members, a pair of nonmagnetic sectors carried by the shaft and operating within the cores, a spring member anchored to one frame member and to the shaft to urge the latter in one direction, and a contact device operable by rotation of the shaft.

2. A polyphase relay, comprising a casing, a pair of triangular frames mounted within the casing in superposed relation, a pair of E cores connecting said frame members, one core applied to each of the side faces of the latter to dispose said cores in converging relation, a horizontal extension formed on each frame member, a vertical shaft rotatably supported upon and between said frame members, a pair of nonmagnetic sectors carried by the shaft and operating within said cores, a coiled spring surrounding the shaft having one end anchored to an extension and the other end to the shaft to urge the latter in one direction of rotation, a stationary contact carried by the other frame extension, and a spring finger carried by the shaft for engagement with said contact.

3. In a polyphase relay, including core members, a shaft, nonmagnetic sectors carried by the shaft operating within the cores, a contact finger carried by the shaft, and a relatively stationary contact member pivotally mounted so as to be engaged by the finger and to automatically move into position upon such engagement to present a maximum area of contact between the finger and contact member.

4. In a polyphase relay including a core, a shaft, nonmagnetic sectors carried by the shaft, a contact finger supported upon the shaft, a stationary stud, and a substantially cubical contact member rotatably supported upon the stud and engageable by the finger, whereby said contact member may move automatically upon such engagement to present a contact face in engagement with the finger affording a maximum area of contact therebetween.

5. A polyphase relay comprising a casing, a pair of superposed triangular frame members mounted in the casing, a pair of core members supported upon said frame members, one at each side of the latter, a horizontal extension on each frame member, a step bearing supported upon the lower extension, a shaft pivotally supported at its lower end upon said bearing, a centralizing arbor adjustably carried by the upper extension and supporting the upper end of said shaft, a pair of nonmagnetic sectors carried by the shaft and operating within the cores, a collar adjustably fixed to the shaft, a coiled spring surrounding the shaft and having one end fixed to said collar and the other end anchored upon an adjacent frame extension, a stationary contact carried by the upper extension in insulated relation thereto, and a contact finger carried by the shaft and cooperating with said contact.

6. A polyphase relay comprising a casing, wound cores mounted therein, movable nonmagnetic sectors operable within the cores, a contact device operable by said sectors, a second casing formed upon the first casing, having one side face open, a plurality of binding posts mounted in said second casing and extending into the first casing, connections between said binding posts and the aforesaid elements within the casing, said binding posts being adapted to receive connecting wires by protrusion of the latter through the wall of said second casing, means upon each binding post to effect a binding connection between said wires and the binding posts, and a cover plate for said second casing.

In testimony whereof, we have hereunto signed our names at Philadelphia, Pennsylvania, this eighteenth day of August, 1917.

BURLEIGH CURRIER.
JOSEPH B. SEAMAN.

Witnesses:
JAMES H. BELL,
EVALYN L. FULLERTON.